UNITED STATES PATENT OFFICE.

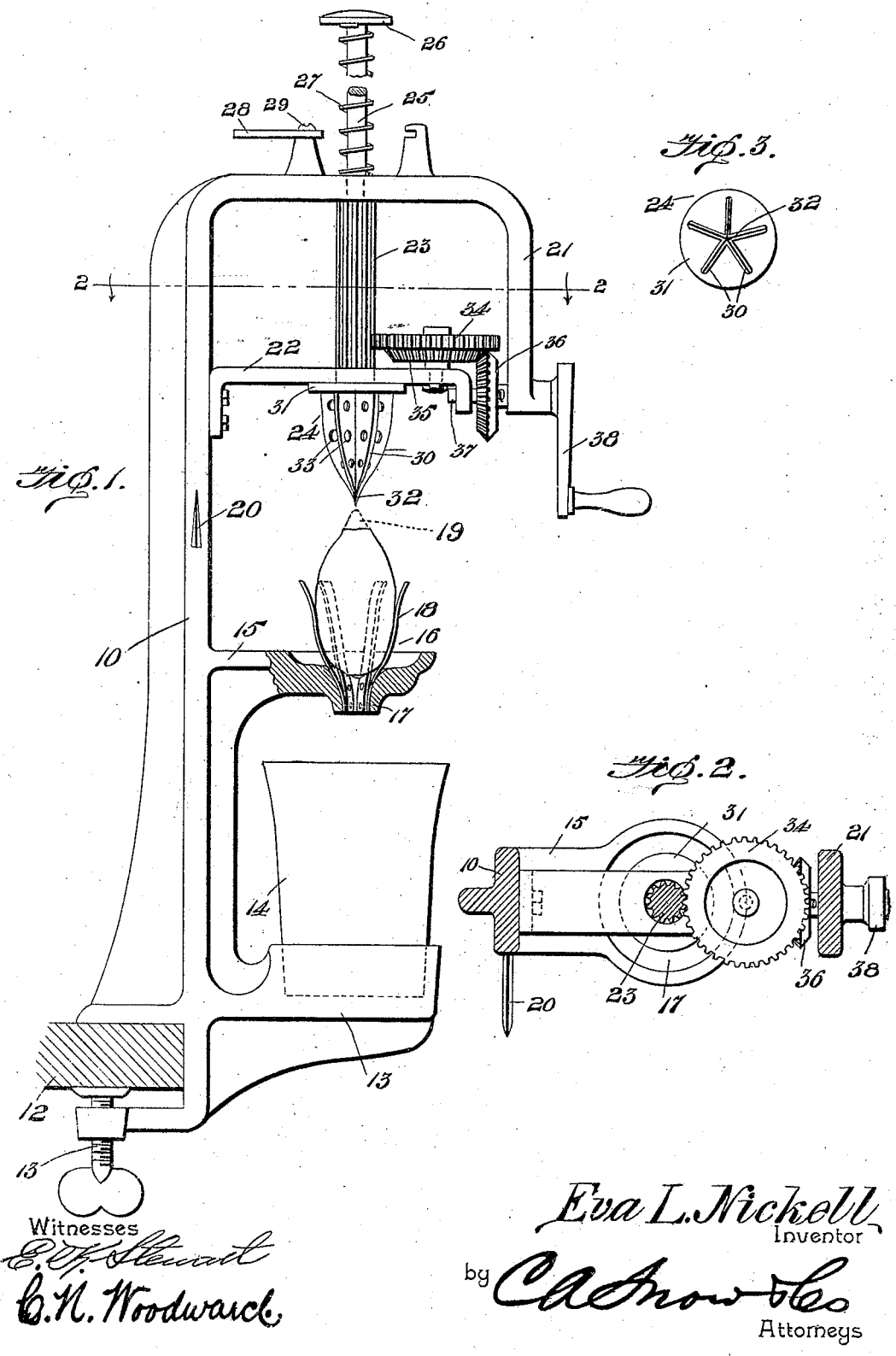

EVA L. NICKELL, OF WAUKOMIS, OKLAHOMA TERRITORY.

LEMON-JUICE EXTRACTOR.

No. 806,279.      Specification of Letters Patent.      Patented Dec. 5, 1905.

Application filed November 3, 1904. Serial No. 231,211.

*To all whom it may concern:*

Be it known that I, EVA L. NICKELL, a citizen of the United States, residing at Waukomis, in the county of Garfield, Oklahoma Territory, have invented a new and useful Lemon-Juice Extractor, of which the following is a specification.

This invention relates to devices for extracting the juice from lemons and for similar purposes, and has for its object to improve the construction and simplify the operation of devices of this character and to more thoroughly, rapidly, and efficiently accomplish the desired results.

With these and other objects in view, which will appear as the nature of the invention is better understood, the same consists in certain novel features of construction as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a side elevation of the improved device. Fig. 2 is a plan view in section on the line 2 2 of Fig. 1. Fig. 3 is a bottom plan view of the extractor-cone detached.

The improved device embodies a supporting-frame 10 of any desired form or material and preferably adapted for attachment, as by a clamp-screw 11, to a table, as at 12. Extending from the frame 10 is a supporting-bracket 13 for the juice-receiver 14, and above this bracket another bracket 15 is arranged for supporting a lemon-holder 16, communicating with a funnel or conductor 17 above the receiver.

The holder 16 consists of spaced curved arms of resilient material, such as wire, and will grasp the lemon (represented at 18) and hold it with sufficient firmness to prevent lateral displacement when the extracting action takes place.

In this device it is intended to extract the juice from whole lemons, and to this end a small portion only of the lemon is removed, as at 19, to permit the extractor to enter, and to provide a complete device a knife-blade 20 is attached to the frame 10, with which to thus prepare the lemon for the action of the extracting implement.

The upper end of the frame 10 is extended laterally and downwardly, as at 21, and connected by a transverse brace 22 to the main frame 10.

Mounted for vertical movement through the brace member 22 is an elongated pinion 23, having at its lower end the extractor member (represented at 24) and at its upper end a guide-rod 25, passing through an aperture in the lateral extension of the frame 10 and terminating in a head 26 and supplied with a spring 27 for maintaining the extractor pinion and rod in their elevated position.

A stop member 28 is pivoted at 29 to the frame in position to extend over the head 26 when depressed, and thus hold the extractor member in its operative position.

The extractor member is formed with radiating wings, as at 30, connected to a head-plate 31, from which the elongated pinion 23 extends, the wings being inclined inwardly toward their lower ends and merged into a relatively sharp point 32 and also provided with spaced transverse apertures 33. The extractor is thus conical in its outlines.

Mounted for rotation in the brace member 22 is a gear-wheel 34 in constant engagement with the elongated pinion 23, so that the gear and pinion are constantly engaged, no matter in what position the latter may be placed.

The gear 34 is formed with a bevel-gear 35, preferably integral therewith, with which a bevel-pinion 36 on a stub-shaft 37 engages, the stub-shaft mounted for rotation in the portion 21 of the frame and provided with an operating-crank 38.

By this simply-constructed device the juice of a lemon may be quickly extracted as follows: Remove a small portion from one end of the lemon, as by the knife 20, placing it in the receptacle 16 with the severed end uppermost, forcing the extractor 24 downward through the lemon by pressure imparted to the head portion 26 until the point 32 punctures the lower end of the lemon and the wings 30 are entirely embedded within the same, the yielding fingers forming the support permitting the rind of the lemon to expand to correspond to the outlines of the extractor. The member 28 is then locked over the upper surface of the head 26, which will hold the extractor in its lower or operative position. Then by rotating the handle 38 the extractor-wings will be correspondingly rotated within the lemon-rind and thoroughly sever the pulp therefrom and extract the juices, which pass to the receiver 14.

The apertures 33 in the wings 30 of the extractor serve an important purpose, as they materially aid in the extraction and permit the juices to freely flow laterally and are thereby prevented from rising unduly and overflowing beneath the top portion 31 of the extractor.

After the juices are fully extracted the lock member 28 is detached, when the spring 27 will immediately and automatically return the extractor to its former position ready for the next action.

By extracting the juice from the lemons without dividing them, as is commonly done, a very material saving in time is accomplished, as will be obvious.

From the foregoing description it will be noted that in operation the head is first inserted longitudinally into the lemon to its full depth before the head is turned to cause the removal of the juice, and the wings of the head serve to cut through the pulp in the first step of the operation and subsequently hold the lemon in place in the socket formed by the fingers during the turning operation.

Having thus described the invention, what is claimed is—

1. A lemon-juice extractor comprising a support for the lemon, an extractor member mounted for movement toward and away from said lemon-support, a spring operating to maintain said extractor member in withdrawn position, means for locking said extractor member in position adjacent to said lemon-support, and means for rotating said extractor member.

2. A lemon-juice extractor comprising a bracket or frame having a support for the juice-receiver and a support for the lemon disposed above said receiver-support, an extractor member movably disposed upon said frame above said lemon-support, means for moving said extractor member toward and away from said lemon-support, means for locking said extractor member in position adjacent to said lemon-support, and means for rotating said extractor member.

3. A lemon-juice extractor comprising a support for the lemon, an extractor member having an elongated gear-pinion and surmounted by a guide-rod and mounted for movement in alinement with said lemon-support, a gear-wheel mounted for rotation and in constant engagement with said pinion, means for moving said extractor and pinion toward said lemon-supporter, and means for rotating said gear-wheel for imparting motion to said pinion or extractor.

4. A lemon-juice extractor having a lemon holder or seat, a head for movement toward and from the holder or seat and provided with radial parallel-faced knives for cutting the lemon-pulp on radial lines, and means for rotating the head.

5. A lemon-juice extractor having a laterally-extensible lemon holder or seat, a head movable toward and from the seat and provided with radial pulp-cutting knives, and means for rotating the head.

6. In a lemon-juice extractor, a support for the lemon in combination with an extractor member formed of radiating wings extending from a head-plate and inclined inwardly and merging into a point and provided with spaced transverse apertures.

7. In a lemon-juice extractor, a support for the lemon comprising a shallow disk-like member having a central aperture and with spaced resilient arms extending above said aperture for receiving the lemon, in combination with an extractor member mounted for movement toward and away from said support, and means for rotating said extractor member.

8. In a lemon-juice extractor, a support for the lemon comprising a shallow disk-like member having a central aperture and with spaced resilient arms extending above said aperture for receiving the lemon, in combination with an extractor member formed of radiating wings extending from a head-plate and inclined inwardly and merging into a point and provided with spaced transverse apertures, said extractor member mounted for movement toward and away from said lemon-holding member whereby said extractor member will be caused to pass into and through the lemon and puncture its lower end to provide an escape for the juices through said holding member, and means for rotating said extractor.

In testimony that I claim the foregoing as my own I have hereto affixed my signature in the presence of two witnesses.

EVA L. NICKELL.

Witnesses:
A. IRBELL,
C. MORRIS.